Aug. 17, 1926.
F. E. GREENE
1,596,428
DRIER AND SEPARATOR FOR SAND AND THE LIKE
Filed August 30, 1922
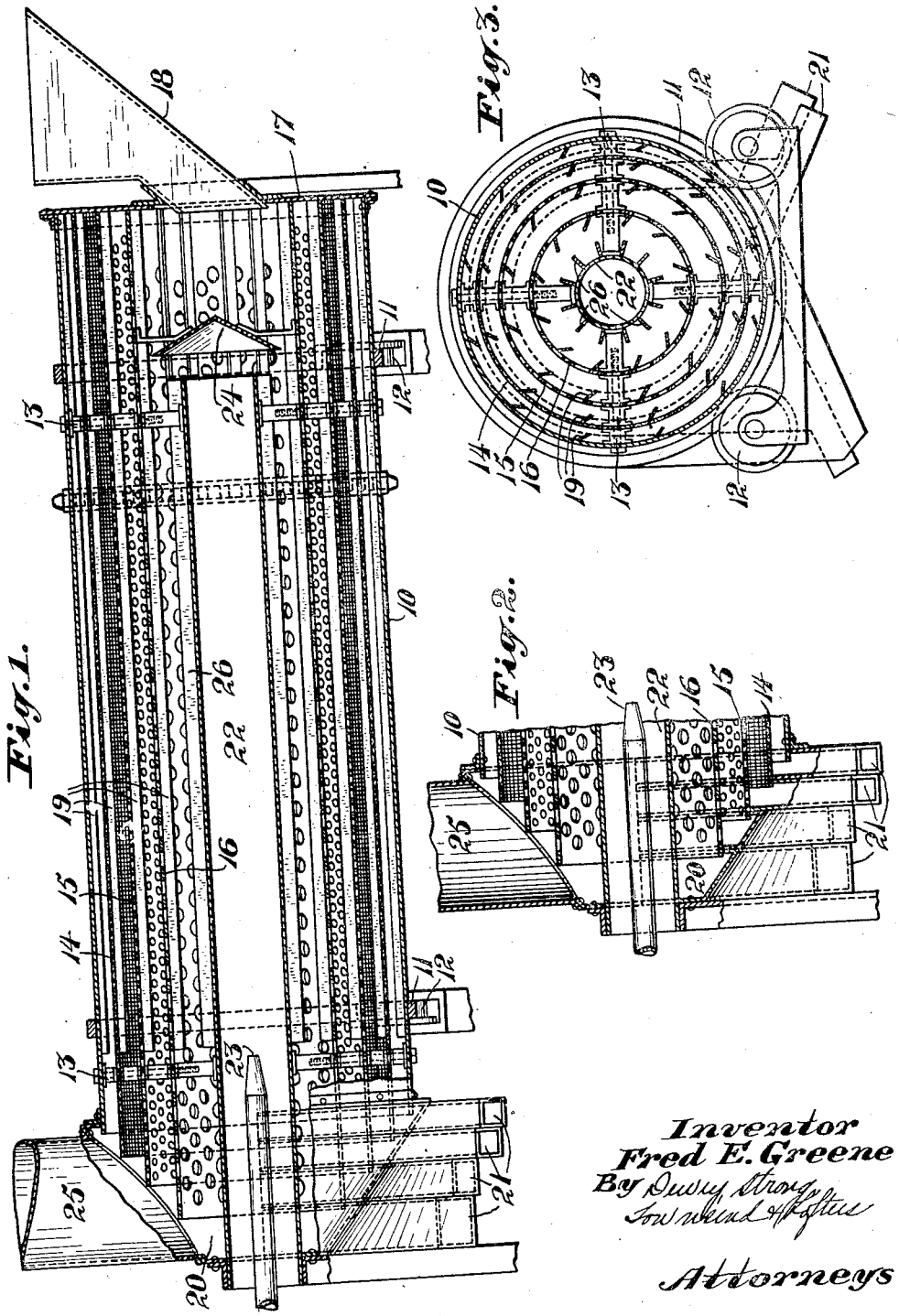
Inventor
Fred E. Greene
By *Attorneys*

Patented Aug. 17, 1926.

1,596,428

UNITED STATES PATENT OFFICE.

FRED E. GREENE, OF OAKLAND, CALIFORNIA.

DRIER AND SEPARATOR FOR SAND AND THE LIKE.

Application filed August 30, 1922. Serial No. 585,251.

This invention relates to the separation and drying of sand, crushed rock, aggregate and the like, and has for its object to separate the materials simultaneously with the heating and drying thereof.

In the making of paving material and the like the specifications usually require exactness as to the quantities of the different sizes of sand, crushed rock, etc. The practice heretofore has been to first heat and dry the material in aggregate form and thereafter separate the same into its various mesh sizes so that the correct proportions of each size may be introduced in the mixture. This separate drying and grading not only increases the time and labor in preparing the material, but also permits the heated material to cool during the subsequent operation of separating the same. I find that better results are obtained where the sand, crushed rock, etc. are hot when brought together with the hot asphalt or other binder.

One form which my invention may assume is exemplified in the following description and illustrated in the accompanying drawing, in which—

Fig. 1 shows a central, longitudinal, sectional view of a device embodying my invention.

Fig. 2 shows a similar view of the delivery end of the device.

Fig. 3 shows a cross sectional view taken near the center of the device.

The mechanism herein shown comprises a rotatable cylindrical shell 10 having peripheral tracks 11 operating upon rollers 12. Carried concentrically within the shell by means of radial spokes 13 are a plurality of cylindrical screens designated respectively 14, 15 and 16, each of a different mesh size, the coarsest screen being near the center of the shell and the finer screen towards the outside. One end of the shell is closed by means of a plate 17 and extending through an opening therein is a feed hopper 18 which discharges on to the innermost screen. The shell is slightly inclined downwardly from the feed end so that the material will gradually work its way towards the opposite end when the shell is rotated. The coarser material will remain on the inside screen and the finer material will pass on to the surrounding screens. To assist in lifting and agitating the material as the shell is rotating the interior of each screen and of the shell is provided with fins or baffles 19 inclined in the direction of rotation of the shell.

The end of the shell and of the screens opposite the feed hopper extend into a housing 20, the shell projecting only a slight distance therein and the screens from the outer to the inner screens being projected successively farther therein. Underneath the discharge end of each screen and of the shell and arranged within the housing is a delivery conduit 21, the conduits or chutes for the finer material preferably delivering to one side and the conduits or chutes for the coarser material delivering to the other side, as shown in Fig. 3.

Extending through the end wall of the housing 20 and into the shell is an open-ended fire tube 22, which is supported by the spokes 13 within the innermost screen. The end of the tube adjacent the housing receives a burner 23 and the opposite end of the tube terminates short of the feed end of the screen. In front of the latter end is a cone-shaped deflector 24 which serves to prevent the sand, crushed rock, etc. from entering the tube and also directs the heated air and flame outwardly so as to allow it to return in the opposite direction through the screens where it discharges through a flue or chimney 25 arranged upon the housing 20. The fire tube rotates with the shell and has on its periphery radial fins or baffles 26 forming pockets to catch the sand or crushed rock that is lifted by the inclined fins or baffles on the interior of the surrounding screen.

The operation of the described structure briefly is as follows: A mixture of sand and crushed rock or aggregate is fed on to the innermost screen through the hopper 18 and the shell is rotated by any suitable means. The material is picked up by the inclined fins or baffles and carried partially around, and at the same time is urged towards the opposite end of the screen, due to the inclination of the shell. The coarser particles are retained on the inside screen, while the finer particles find their way on to the surrounding screens. By the time the material reaches the opposite end a complete segregation has been effected, and the different grades are delivered into separate discharge chutes. The burner being in operation will cause the material to be dried and heated during its passage through the screen device. The heating action is assisted by the passing of the flame and the heated air longitudinally through the fire tube and returning it diagonally through all the screens. Inasmuch as the burner is arranged at the discharge end of the device the material will be gradually heated before reaching the hottest part of the device. The action of the inclined fins, is to lift and carry the material up to a point where it will fall off and pass through the returning hot blast. The material on the inner screen will be dropped on to the fire tube and the radial fins on the latter will retain it and carry it around for about one-third of a turn so that the full effect of the heat is imparted thereto.

The material is thus separated and heated and can be mixed with asphalt or other binder in the desired quantities while still hot.

Various changes in the construction and arrangement of the several parts herein shown and described may be employed without departing from the spirit of my invention as disclosed in the appended claims.

Having thus described my invention, what I claim and desire to secure by Letters Patent is:—

1. A combined separating and heating device for material of the character mentioned comprising a rotating cylindrical shell, a plurality of screens carried thereby and arranged concentrically therein of graduated mesh decreasing in size from the center to the outside, means for feeding material on to the innermost screen at one end, individual delivery means at the opposite end of each screen, a fire tube extending axially through the innermost screen and terminating adjacent the feed end thereof, a burner in the opposite end of the tube, and means for directing the heated air from the fire tube along the length of the screens and means to rotatably support the shell.

2. A combined separating and heating device for material of the character mentioned comprising a rotating cylindrical shell, a plurality of screens arranged concentrically therein of graduated mesh decreasing in size from the center to the outside, means for feeding material on to the innermost screen at one end, individual delivery means at the opposite end of each screen, a fire tube extending axially through the innermost screen and terminating adjacent the feed end thereof, a burner in the opposite end of the tube, a deflector in front of the discharge end of the tube for directing the heated air on to the screens and a flue adjacent the discharge end of the shell for taking off the heated air.

3. A combined separating and heating device for material of the character mentioned comprising a rotating cylindrical shell, a plurality of screens arranged concentrically therein of graduated mesh increasing in size from the center to the outside, means for feeding material on to the innermost screen at one end, individual delivery means at the opposite end of each screen, a fire tube extending axially through the innermost screen and terminating adjacent the feed end thereof, a burner in the opposite end of the tube, and means for directing the heated air from the fire tube along the length of the screens, each of said screens being provided with baffles on its interior for agitating and lifting the material and pockets arranged on said fire tube for receiving the material dropped from the fins of the surrounding screen.

4. A combined separating and heating device for material of the class mentioned comprising a rotating cylindrical shell, a plurality of concentric screens therein of graduated mesh decreasing in size from the center to the outside, means for feeding material on to the innermost screen at one end, a stationary housing at the opposite end of the shell and screens, delivery devices arranged on said stationary housing, one for each of said screens, a fire tube extending axially through the innermost screen and rotating with said shell and screens, a burner arranged in the end of said fire tube adjacent the housing, a chimney on said housing, and means adjacent the discharge end of the fire tube for directing the heated air from the burner on to the screens to allow it to return in the opposite direction to the chimney.

FRED E. GREENE.